United States Patent [19]

Barner et al.

[11] 3,988,416

[45] Oct. 26, 1976

[54] ELEVATED PRESSURE OPERATION IN THE CUPRION PROCESS

[75] Inventors: Herbert E. Barner, Westford; Roger N. Kust, Acton, both of Mass.; Robert P. Cox, Wyckoff, N.J.

[73] Assignee: Kennecott Copper Corporation, New York, N.Y.

[22] Filed: June 13, 1974

[21] Appl. No.: 479,153

[52] U.S. Cl. ................................. 423/33; 423/49; 423/53; 423/150
[51] Int. Cl.[2] .................... C01G 3/14; C01G 39/00; C01G 51/12; C01G 53/12
[58] Field of Search ................. 423/246, 27, 32, 33, 423/49, 50, 53, 150, 142, 143, 140, 141; 75/101 R, 103, 117, 119, 1

[56] References Cited

UNITED STATES PATENTS

| 1,589,296 | 8/1926 | MacKay | 75/117 |
| 2,043,263 | 6/1936 | Porter | 423/246 |
| 2,647,829 | 8/1953 | McGauley et al. | 423/33 |
| 2,647,832 | 8/1953 | Allen | 75/103 |
| 2,871,116 | 1/1959 | Clark | 75/108 |
| 3,804,614 | 4/1974 | Coffield et al. | 423/32 X |
| 3,833,717 | 9/1974 | Haskett | 75/117 |
| 3,950,487 | 4/1976 | Pemsler | 423/32 |

FOREIGN PATENTS OR APPLICATIONS

| 577,978 | 6/1959 | Canada | 423/246 |

OTHER PUBLICATIONS

Byerley et al "The Reduction of Cupric Salts in Aqueous Solutions by Carbon Monoxide," Symposium on Unit Processes in Hydrometallurgy 1963, Gordon and Breach, New York 1964 pp. 183–203.
Byerley et al. Chem. Abstracts vol. 64, 1966 No. 13441h.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

A process in which copper, nickel, cobalt and molybdenum are recovered by direct leaching of comminuted raw manganese nodules with an aqueous ammoniacal leach solution containing cuprous ions. During the process cuprous ions are consumed and are oxidized to cupric ions. The cuprous ions are regenerated by reducing the cupric ions with a reducing gas. An improvement is disclosed which results from increasing the pressure of the reducing gas. This increased pressure facilitates maintaining a high cuprous ion concentration in each reaction vessel, by increasing the rate at which the cuprous ions are regenerated from the cupric ions without affecting the rate at which the metal values are recovered from the nodules, which in turn, increases the efficiency of each reactor thus enabling the size of reactors to be reduced.

In one important embodiment of the invention, the reducing gas is sparged into a series of reaction vessels at increased pressure while the manganese nodules are injected into several vessels simultaneously. This increased pressure of the reducing gas together with the multiple point injection of the manganese nodules greatly increases the efficiency of the process.

In another important embodiment of the invention as the reducing gas is sparged into the reaction vessels under increased pressure sufficient heat is removed from the slurry leaving each reaction vessel so that all reaction vessels operate at substantially the same temperature within the range of 35°–55° C. By operating within this temperature range, nickel and cobalt solubilization within the reaction vessels is improved.

15 Claims, 4 Drawing Figures

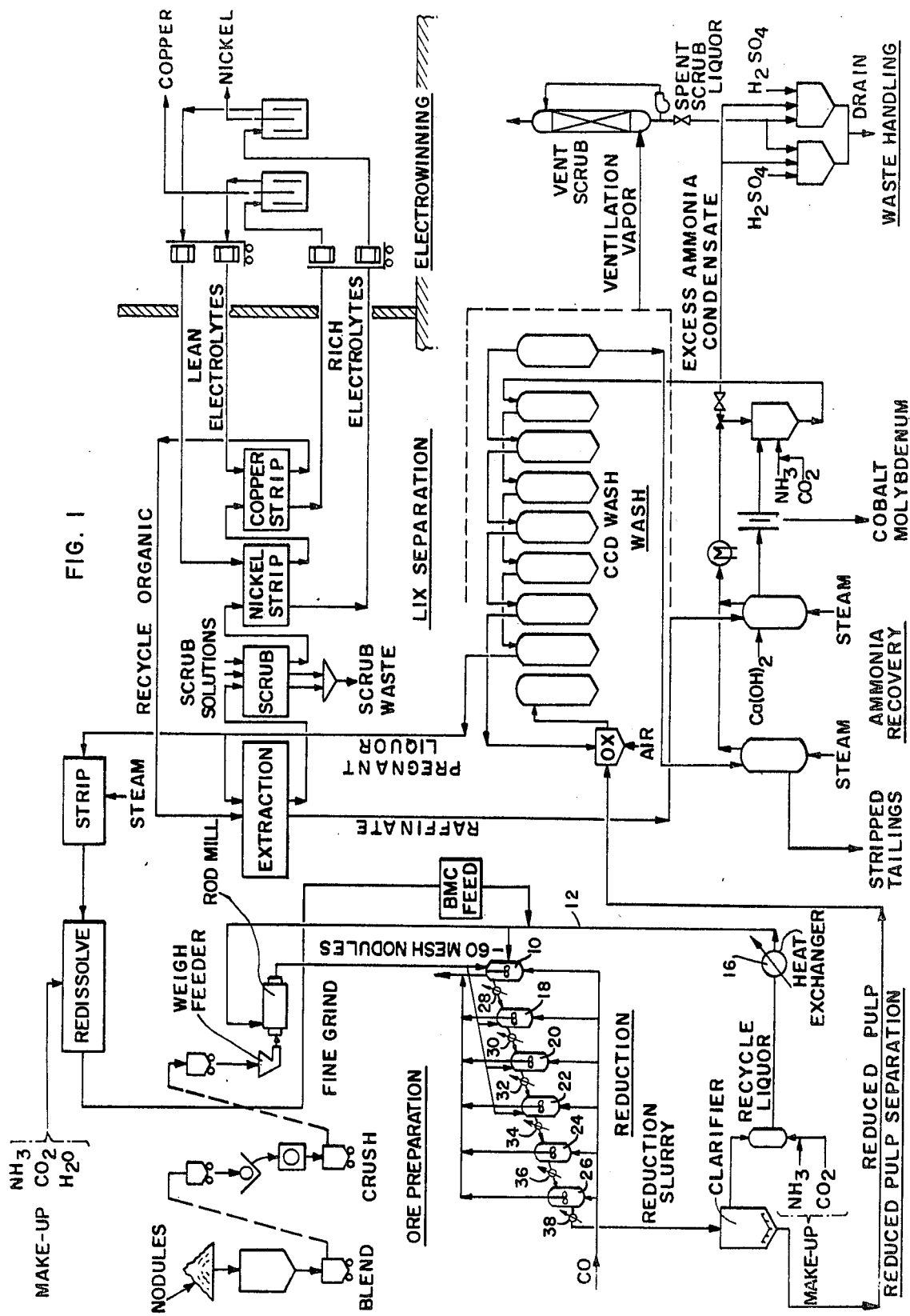

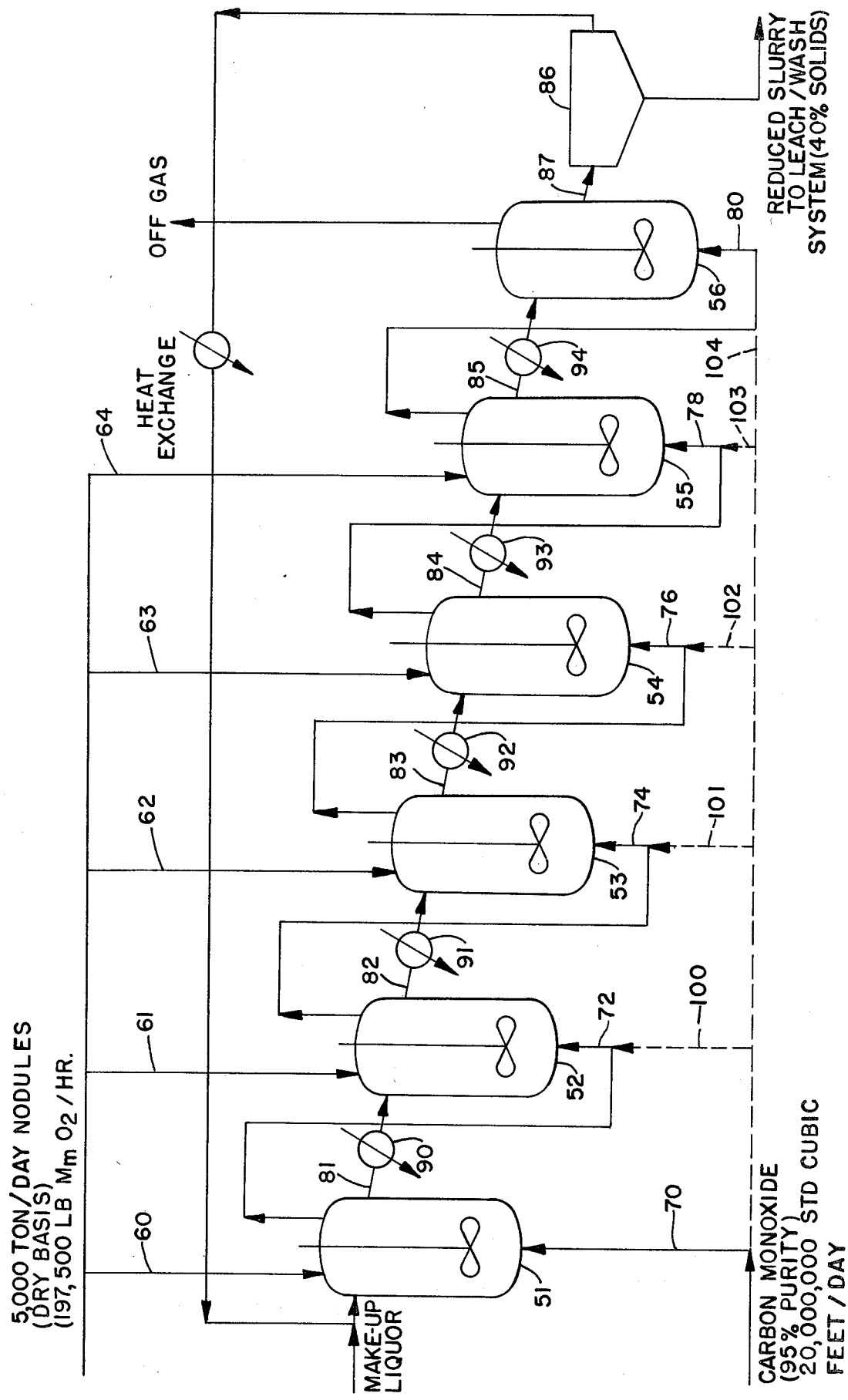

ELEVATED PRESSURE OPERATION IN THE CUPRION PROCESS

BACKGROUND OF THE INVENTION

In Patent application Ser. No. 311,063 entitled "Recovery of Metal Values from Manganese Deep Sea Nodules", filed on Dec. 1, 1972, by Lester J. Szabo, the teachings of which are incorporated herein by reference, a process is disclosed in which copper, nickel, cobalt and molybdenum are recovered from raw manganese nodules with an aqueous ammoniacal leach solution containing cuprous ions. The process disclosed in application Ser. No. 311,063 is a significant breakthrough in the metallurgical art in that it significantly expands the world's source of copper, nickel, cobalt and molybdenum. The process disclosed in application Ser. No. 311,063 has come to be called the "cuprion process". In patent application Ser. No. 311,063, a continuous process for recovering copper, nickel, cobalt and molybdenum from manganese deep sea nodules is disclosed which includes the step of contacting ground manganese nodules with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue. The reduction liquor can be recycled to the reaction vessel in which the manganese nodules are added. To maintain a sufficient amount of cuprous ions, a reducing gas, such as carbon monoxide, is passed through the reaction vessels. In patent application Ser. No. 311,063, the reaction system disclosed is operated at temperatures between the range of 40°–70° C, a pH between the range of 10.6–10.8 and a pressure of approximately one atmosphere. Furthermore in that process the manganese nodules are injected into a single reaction vessel. The process described in Ser. No. 311,063 requires extremely large reactors, or large number of smaller reactors in order to process a nominal output of metal values. In addition, the process disclosed in that application is operated at a pH of about 10.6. It has been found desirable to lower the pH; however, the rate of cuprous ions regeneration is proportional to the pH, with the rate increasing as the pH increases.

SUMMARY OF THE INVENTION

In accordance with the present invention, it has been disclosed that operating the reduction reactors at pressures above atmospheric pressure increases the rate at which cupric ions are reduced to cuprous ions by a reducing gas. This rate increase enables the utilization of smaller reaction vessels. Furthermore, by increasing the pressure within a reaction vessel, the pH of the system can be lowered which results in an increase in the process efficiency.

In accordance with the present invention, it has also been discovered that high temperatures decrease the recovery rate and that there is an optimum operating temperature range which is 35°–55° C. With the process of the present invention, a higher throughput of nodules is possible because the process includes a control means to maintain the temperature in each reaction vessel within the prescribed temperature range (35°–55° C).

In accordance with the present invention, it has also been discovered that when all of the feed stock of manganese nodules is fed into the reaction system of the cuprion process at a single point, the cuprous ion concentration can be reduced by the reaction with the nodules to such a level that recovery and regeneration of cuprous ions would not proceed efficiently. Accordingly, in accordance with the present invention, heat is removed from the slurry leaving each reaction vessel and the feed stock of manganese nodules is injected into a series of reaction vessels. This multiple point injection reduces the number of reaction vessels needed in the process and greatly reduces the size of the reactor that would be necessary in the single point nodule injection process. In short, multiple point injection of the nodule facilitates the regeneration of cuprous ions from cupric ions.

As a result of operating the cuprion process within the temperature range of 35°–55° C there is an improvement in nickel and cobalt solubilization.

Accordingly, it is an object of the present invention to provide an improved process for solubilizing metal values in manganese nodules.

A further object of the present invention is to provide a multistage process for the continuous reduction of manganese nodules by the cuprion process in which the amount of cuprous ions in each stage of the process is relatively high.

A further object of the present invention is to provide a multistage process for the continuous extraction of metal values from manganese nodules by the cuprion process in which the pressure of the reducing gas is increased in order to increase the rate at which cuprous ions are regenerated.

A further object of the invention is to increase the pressure of the reduction section of the cuprion process in order to lower the pH of the system to about 10 without lowering the reaction rates to an undesirable level.

A further object of the present invention is to provide a multistage process for the continuous extraction of metal values from manganese nodules by the cuprion process in which manganese nodules are injected into successive reaction vessels, heat is removed from each reaction vessel, and the reducing gas is fed into each reactor under increased pressure.

BRIEF DESCRIPTION OF THE DRAWING

FIG. 1 is a flow sheet illustrating the process of the present invention,

FIG. 4 is a flow sheet of an alternate embodiment of the invention in which a single stream of reducing gas flows through a series of reduction reactors in a cocurrent manner with the manganese nodules.

DESCRIPTION OF THE PREFERRED EMBODIMENT

Figure 3:
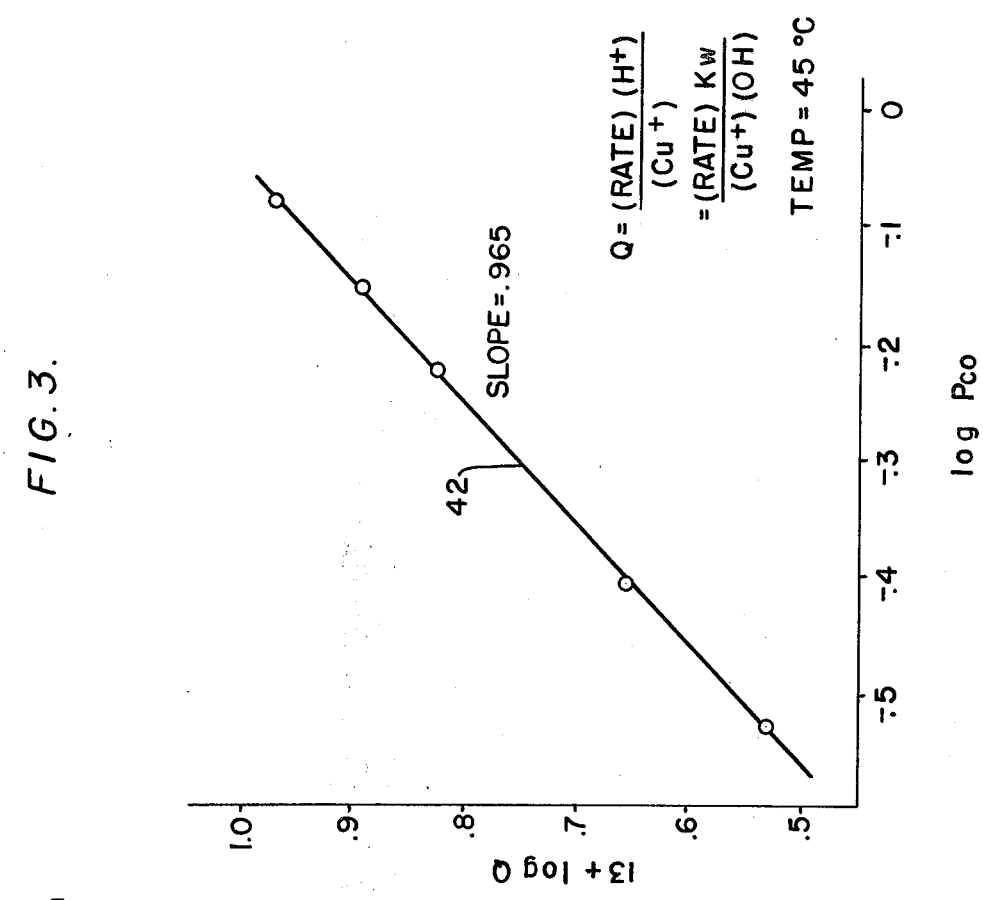
FIG. 3 is a curve showing the variation of log Q with log (partial pressure CO)

At the outset, the process of the present invention is described in its broadest overall aspects with a more detailed description following. The present invention is directed to the recovery of metal values from manganese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various chemical aspects of manganese nodules. For a detailed chemical analysis of nodules from the Pacific Ocean see pages 449–450 in The Encyclopedia of Oceanography, edited by R. W. Fairbridge, Reinhold Publishing Corp., N.Y. 1966, and U.S. Pat. No. 3,169,856. For the purposes of this invention the complex ores will be considered as containing the following approximate metal content range on a dry basis:

| METAL CONTENT ANALYSIS RANGE | |
|---|---|
| Copper | 0.8 – 1.8 % |
| Nickel | 1.0 – 2.0 % |
| Cobalt | 0.1 – 0.5 % |
| Molybdenum | 0.03 – 0.1 % |
| Manganese | 10.0 – 40.0 % |
| Iron | 4.0 – 25.0 % |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

In the cuprion process, raw manganese deep sea nodules are reduced with curpous ions (Cu+) in an aqueous ammoniacal ammonium carbonate solution. The cuprous ions reduce the manganese in the nodules which enables metal values such as copper, nickel, cobalt and molybdenum to be dissolved while leaving undesirable metals such as iron in the solid residue. In the reduction process, the manganese dioxide in the deep sea nodules is reduced by cuprous ion to manganese carbonate according to the reaction $$MnO_2 + 2\ Cu(NH_3)_2^+ + 4\ NH_3 + CO_2 + H_2O \rightarrow MnCO_3 + 2\ Cu\ (NH_3)_4^{2+} + 2\ OH^- \quad (1)$$

Cupric ions indicated in equation (1) are reduced back to the cuprous state with carbon monoxide according to the reaction $$2\ Cu\ (NH_3)_4^{2+} + CO + 2\ OH^- \rightarrow 2\ Cu(NH_3)_2^+ + 4\ NH_3 + CO_2 + H_2O \quad (2)$$

Cuprous ion is consumed in reaction (1) and is regenerated by reaction (2). The net overall reaction for the reduction process is the sum of equations (1) and (2), or equation (3):

$$MnO_2 + CO \rightarrow MnCO_3 \quad (3)$$

In order to provide an efficient reactor system for the cuprion process, it is necessary to balance the rate of reactions (1) and (2). In accordance with the present invention, it has been discovered that the rate of reduction of reaction (2) is a first order function of the carbon monoxide pressure. Thus, increasing the pressure ten fold, increases the rate of reaction (2) 10 fold. At this point it should be noted, however, that the present invention is directed toward increasing the efficiency of the process set forth in application Ser. No. 311,063. In this regard it should also be noted that it is possible to produce acceptable results with the process disclosed in that application at low pressures, i.e. ambient pressures. Indeed by following the teachings of that invention it is possible to recover metal values from deep sea nodules at pressures of about two tenths of an atmosphere. However, the recovery of metals at a low pressure is not economically competitive with the process of the present invention.

Another advantage which derives from increasing the pressure in accordance with the present invention is that the pH of the system can be lowered. In connection with the foregoing, it has been found that the rate of reaction (2) is proportional to the pH and that in order to produce a significant amount of regeneration in accordance with reaction (2) the pH must be maintained at about 10.6. However, pH's this high, increase the cost of the washing operation. That is with pH's lower than 10.6, the reduced manganese nodules can be washed more efficiently. By increasing the pressure of the reduction circuit from one atmosphere (14.7 lbs/sq in) to about 60 lbs/sq in, it is possible to operate at a pH of about 10 with rates equal to those obtained at a pH of 10.6. Operating at this lower pH enables the reduced nodules to be washed more efficiently. At this pressure and pH, however, the reduction circuit is also operated efficiently.

It has been discovered that the rate of regeneration of cuprous ions as set forth in equation (2) is affected by temperature. An increase in temperature increases the rate of equation (2). Thus, it would be expected that there would be no need to remove any heat generated in the process. Indeed, it might be thought advisable to actually heat the reactor in order to increase the rate. It turns out, however, that as the temperature increases, the extent of metal recovery decreases. Indeed, applicants have been unable to theorize why the recovery decreases with increased temperature. However, numerous tests have indicated that recovery does decrease as the temperature increases.

In accordance with the present invention it has been discovered that there is an optimum temperature range for equations (1) and (2) which take place in the reaction vessels. That temperature range is 35°–55° C. The preferred operating temperature for each reaction vessel is approximately 55° C. To maintain the temperature within the foregoing range, heat is removed from the slurry which leaves each reactor. In one important embodiment of the present invention, heat is removed from the slurry leaving each stage in sufficient quantities so that the temperature in each reaction vessel is substantially identical. In another embodiment, heat is removed from the slurry in sufficient quantities so that the temperature in each reaction vessel is between the range of 35°–55° C.

In one important embodiment of the invention, the pressure of each reactor is increased above ambient pressure and the nodules to be processed are injected into several reactors simultaneously. It is a well established principle of chemistry that the rate at which a chemical reaction proceeds is usually controlled by the concentration of the reactants. Thus, it would be expected that as the cupric ion became high in value, its reduction with carbon monoxide would proceed at a relatively rapid rate; however, this is not the case. Indeed, it has been discovered that under the conditions proposed in the present process, an increase in the amount of cupric ions has little effect on this reaction rate. Furthermore, it has been discovered that in order to maintain a high cuprous ion concentration, the cuprous ion level can never be allowed to go to an extremely low level. Although applicants do not intend to limit their invention by any theory of operation, it is believed that this phenomenon can be explained theoretically by the following reactions which occur when carbon monoxide in the gaseous phase is added to an aqueous solution of cuprous ions. In equations (4), (5), and (6) the effect of ammonia has been omitted for clarity.

$$CO(g) \rightarrow CO(solution) \qquad (4)$$

$$Cu^+ (solution) + CO(solution) \rightleftarrows CuCO^+ solution \qquad (5)$$

$$CuCO^+(solution) + OH^-(solution) \rightarrow [CuCOOH]\text{-}(solution) \qquad (6)$$

At this point, it should be noted that the formation of [CuCOOH] in accordance with Reaction (6) is slow. The significance of the foregoing is that [CuCOOH] appears to be an intermediate for the reduction of cupric ions to cuprous ions, the formation of which does not depend on the amount of cupric ions. Furthermore, in the absence of significant mass transfer resistance in equation (4), the formation of [CuCOOH] in reaction (6) appears to be the rate limiting chemical reaction for the reduction of cupric ions to cuprous ions with carbon monoxide. Thus, a species that should be present in order to form cuprous ions from cupric ions is the cuprous ion itself as well as the cupric ion. Because of this autocatalytic nature of the cuprous ion regeneration, the amount of cuprous ions should never be allowed to go to zero. In short, no matter what the chemistry of the regeneration of cuprous ions might be, applicants have discovered that in order to maintain enough cuprous ions at all stages of the cuprion process by regeneration from cupric ions, the cuprous ion concentration must be maintained at a fairly high level because the reduction of cupric ions to cuprous ions is controlled by the actual amount of cuprous ions. In fact, if the level of cuprous ions is below about 2 grams per liter (at atmospheric pressure, pH's below 10.0 and temperatures below approximately (40° C) effective regeneration of cuprous ions is not commercially feasible. If the pH is increased above 10.0, or the CO pressure is increased, then it would be possible to allow the level of cuprous ions to drop below 2 grams per liter.

In order to maintain the cuprous ion concentrations fairly high at all levels of the process, the pressure of the carbon monoxide gas is increased. Increasing the pressure favors the formation of the cuprous carbonyl complex in reaction (6). To further increase the efficiency of the process, the nodule feed stock is injected at multiple points. This multipoint injection facilitates the regeneration of cuprous ions by reducing the possibility that the nodules will exhaust the supply of cuprous ions by reacting with them.

In addition to the foregoing, in one important embodiment of the invention, the temperature is maintained between the range of 35°–55° C within each reduction reactor.

The process of the present invention is further illustrated by the following example in conjunction with the drawing. At the outset, however, it is emphasized that the following description relates to a procedure that has been performed in a pilot plant. By extrapolating the results obtained from the pilot plant, however, one skilled in this art can design a commercial plant for processing large quantities of nodules in accordance with the present invention.

The pilot plant was designed for one half tons per day nodule throughput, based on a 3½ percent solid slurry and with up to a 3 hour hold-up in the reduction section.

The process performed in the pilot plant can be broken down in the following sections:
1. Ore Preparation
2. Reduction-Leach
3. Oxidation and Wash-Leach
4. LIX Separation of the Metals
5. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a Jacobson "Full Nelson" crusher to reduce the raw nodules to minus 1 inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill for final grinding. The rod mill reduces the nodules from a particle size of minus 6 mesh to a particle size of approximately minus 60 mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in a commercial operation the nodules would be processed directly after being mined from the ocean bottom; thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor to the rod mill. In a commercial process recycle liquor can be added to the grinding mill in order to provide a liquor to facilitate grinding and reduce the dust problem without introducing more water into the circuit which would cause undesirable dilution. Of course, the recycle reduction liquor is advantageous in maintaining the proper copper concentration in the reduction circuit as well to provide liquor which is useful in the grinding process itself. Details of the recycle liquor circuit are amplified below.

REDUCTION-LEACH

The reduction-leach portion of the pilot plant is the location where the nodules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant won't have to be shut down in the event that there is a malfunction in some piece of ore preparation machinery. After leaving the surge tank, a feed pump pumps the slurry to the reduction circuit.

The reduction circuit includes six reactors connected in series. These reactors are sixty gallon capacity reactors which are used to a 42 gallon capacity in the actual processing. Each reactor is formed of 316 stainless steel and is outfitted with an agitator, pressure gage, level alarm, and gas sparging equipment. In accordance with the present invention, it is advantageous to provide reactors which can withstand pressures at least up to 100 lb/sq in.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotometers which give an indication of the amount of gases coming out of a reactor. The off gases go through an ammonia scrubber and are exited to the atmosphere.

The reactors themselves are outfitted with gravity overflows so that there is a cascading system from the first through the sixth reactor.

In one important embodiment of the invention, each of the first four reactors is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been found advantageous, however, that there be no nodule injection into at least the last reactor. That is, each portion of nodules should pass through two stages in progression; therefore, there should be no nodule injection in the last stage. It should be noted that in the pilot plant process there is no nodule injection in the last two stages. Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. Preferably the carbon monoxide is sparged into each reactor under pressure so that the pressure in each reactor is between the range of 50–100 lbs/sq in. The slurry in the fifth and sixth reactors is approximately 3.5 percent solids and the average residence time in the system is twenty minutes per stage. The slurry overflowing the last reactor is flocculated to enhance settling before entering a clarifier. The clarifier is used to separate the liquid from the solids.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and approximately 15 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors under a pressure of about 50 lbs/sq in at a total rate of about 70 standard cubic foot per hour. At this point it should be noted that the amount of carbon monoxide that is fed into each stage of the reactor is controlled by the cuprous ion concentration of the contents of any given reactor. This is determined by analyzing the contents of the reactor periodically. During start-up, this is done every half hour and is continued once an hour while the process is in the steady state stage.

Approximately 120 gallons per hour of reduction slurry enters the clarifier. The solids leave the bottom of the clarifier in the form of a slurry with approximately a 40 per cent solids content. The overflow from the clarifier is clear liquid which constitutes the recycle reduction liquor. However, after leaving the clarifier, the recycle reduction liquor enters a surge tank whereupon it is passed into an ammonia makeup unit. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger into the first reactor and the grinding mill. The heat exchanger removes heat that was generated in process.

In accordance with the present invention, heat exchangers 28, 30, 32, 34, 36 and 38 are positioned in the flow path of the slurry leaving reactors 10, 18, 20, 22, 24 and 26 respectively. These heat exchangers are shell and tube heat exchangers. In this type of heat exchanger, the slurry passes through a tube and a water coolant flows through the shell surrounding the tube counter to the flow of the slurry.

In one embodiment of the present invention the recycled liquor 12 entering reaction vessel 10 is at a temperature of about 51° C. As a result of the reactions which take place in vessel 10, the temperature therein is increased to 55° C. A sufficient amount of heat is removed from the slurry leaving reaction vessel 10 by heat exchanger 28 so that the temperature in reaction vessel 18 will not exceed 55° C. The same heat extraction is continued for reaction vessels 20 through 26. It should be noted that the temperature of the slurry increases about 3° C in reactors 10–22. Thus, in order to maintain the temperature within reactors 10–22 at a temperature of 55° C, heat exchangers 28, 30 and 32 lower the temperature of the slurry to about 51° C. The temperature does not increase greatly in reaction vessels 24 and 26. This is due to the fact that the reaction between the nodules and the cuprous ions is the reaction that generates the most significant amount of heat. However, in reactors 24 and 26 no fresh nodules are introduced; therefore, the temperature in these reactors does not increase significantly.

In an alternative embodiment of the invention, heat is removed from the slurry so that the temperature in any reaction vessel is between the range of 35°–55° C. In this embodiment of the invention it is not necessary to remove heat from each stage. For example, the slurry leaving reactor 10 may be allowed to enter reaction vessel 18 without any heat removal. If the temperature of the slurry in reaction vessel 10 is 51° C it will attain a temperature of about 54° C in reaction vessel 18. Heat can then be extracted from the slurry leaving reaction vessel 18 by heat exchanger 30. This heat exchanger may lower the temperature of the slurry to 51° C so that the temperature in reaction vessel 20 reaches a value of 55° C. Of course the details of how to maintain the temperature within each reactor 10–26, at either a constant range or a constant single temperature, is well within the skill of those in this art.

It should be noted that the slurry leaving the reaction vessel 26 passes through a heat exchanger 38. If heat is extracted by a heat exchanger located at this position in the circuit then it need not be extracted by heat exchanger 16. In another embodiment of the invention one-half of the heat to be removed may be extracted by heat exchanger 38 and the other half may be extracted by heat exchanger 16.

One advantage of operating the reduction reactor within the range of 35°–55° C is an improved nickel and cobalt solubilization. For example, a test showed that for reactors operated at 65° C, a pH of 10.8, 120 g/l $NH_3$ and a $CO_2/NH_3$ ratio of 1:5, nickel solubilization was minus (−) 19.3% and cobalt solubilization was minus (−) 121%. The minus value indicates that nickel and cobalt in the recycle liquor goes into the solids phase. When the temperature was decreased to 50° C with other parameters held constant, the nickel solubility was increased to 88% and the CO solubility was increased to 77.8%. The lower temperature did not greatly affect copper solubilization.

A small stream of basic metal carbonate (BMC) containing primarily copper and nickel carbonates can also be recycled to the first stage if required to maintain the total copper in the reduction system at an acceptable level. This stream of basic metal carbonate compensates for unsolubilized copper leaving the reduction loop in the clarifier underflow. Details of the BMC recycle are amplified below.

OXIDATION AND WASH-LEACH

In the oxidation and wash-leach circuit, the clarifier underflow is combined with second stage wash liquor and the resulting slurry is oxidized with air to convert the cuprous ion in the clarifier underflow to cupric ion to facilitate future processing. The oxidized slurry is then pumped to a countercurrent decantation system (CCD) consisting of seven stages of countercurrent washing units. The wash-leach steps are carried out on a batch basis in nine tanks. It should be noted that in the pilot plant nine stages are used to simulate a countercurrent wash system. Although this system is not truly a countercurrent, it has been able to demonstrate that a seven reactor countercurrent system is advantageous. The two extra units used in the pilot plant are necessary because one unit is either being filled or is being emptied. In the wash-leach system, the metal solubilization is completed as the displacement wash process is carried out. Fresh wash liquor is added to the seventh stage of the system as a solution containing 100 grams per liter ammonia and 100 grams per liter carbon dioxide. Liquor is transferred from one tank of the settled slurry every twelve hours to another appropriate tank in the system to affect the countercurrent washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor, containing the metal to be recovered, is decanted from the first wash stage and pumped to a surge tank. Fresh ammonia solution without metals is added to the last solids wash stage. The metal values in solution range from approximately 0 in the fresh wash liquor to between 4–8 grams per liter copper and 5–10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reactor. The tailings, which are nothing more than reduced nodules washed of most of their non-ferrous metal values and with the manganese converted to manganese carbonate, are sent to a surge tank (not shown). From the surge tank, they are then pumped to a steam stripping operation where the ammonia and $CO_2$ are driven off. The tailings are then drummed. The ammonia and $CO_2$ obtained in the steam stripper may be recycled.

BMC RECYCLE

A portion of the pregnant liquor from the oxidation and wash-leach circuit is steam stripped on a batch basis to remove ammonia and carbon dioxide and to precipitate the basic metal carbonates. The precipitated basic metal carbonates are dissolved in an aqueous solution containing approximately 60 g/l $NH_3$ and 60 g/l $CO_2$. This BMC feed is pumped to the first stage of the reduction circuit.

LIQUID ION EXCHANGE SEPARATION

The pregnant liquor contains various metal values including copper, nickel, cobalt and molybdenum. In the liquid ion exchange separation circuit, the object is to separate the copper, nickel, cobalt and molybdenum from each other and from the pregnant liquor. Initially, the copper and nickel are coextracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4 HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration. For further details of a liquid ion exchange procedure which can be employed, see U.S. application Ser. No. 266,985 entitled Selective Stripping Process by Roald R. Skarbo, filed June 28, 1972, the teachings of which are incorporated herein by reference.

ELECTROWINNING

Metal recovery is accomplished by electrowinning copper and nickel from the solution prepared in the LIX plant as described above. This process is performed on a batch basis for the copper recovery and on a continuous basis for the nickel recovery in a separate plant. The metal containing solutions are transferred once a day.

THE EFFECT OF PRESSURE

In accordance with the present invention, experiments were performed to show how pressure affects the rate of cuprous ion regeneration. To establish the relationship between pressure and rate, the pressure was not increased but reduced. However, reducing the pressure from ambient pressure (atmospheric) to various pressures below atmospheric pressure, enabled the relationship between pressure and rate to be determined.

Experiments were performed in which the generation of cuprous ion ($Cu^+$) and pH change were followed as functions of time at a specified CO pressure. For each experiment, the pressure of CO was controlled by dilution of the inlet gas with nitrogen. From this data, the rate of $Cu^+$ generation was determined by fitting a polynominal to the $Cu^+$ vs. time data as is shown by curve 40 of FIG. 2, and differentiating the resultant equation to get an equation representing the rate of $Cu^+$ generation with time. Then the function Q was evaluated for several points (usually about 8) in time by solving the relation $$Q = \frac{(rate)(H^+)}{(Cu^+)}$$

The average value of $Q$ was then compared to the average CO pressure for the particular experiment.

Five experiments were done with the results listed in Table I. Temperature was 45° C in each case

TABLE I

| Average Q | Average Pco, atm |
|---|---|
| $3.38 \times 10^{-13}$ | .297 |
| $4.46 \times 10^{-13}$ | .391 |
| $6.48 \times 10^{-13}$ | .58 |
| $7.69 \times 10^{-13}$ | .69 |
| $9.32 \times 10^{-13}$ | .82 |

The log of $Q$ was plotted against the log of the CO pressure to obtain curve 42 (see FIG. 3). As is shown by the slope of curve 42, the rate equation has a first order dependency on CO pressure.

The experiments which were done to provide the necessary data on which to base a rate law were carried out in a 1 l jacketed reaction vessel fitted with a gas tight Plexiglass top. The top was fitted with a variety of 316 stainless steel access ports by drilling and tapping the Plexiglass top. Stirring was accomplished with a 2-inch diameter marine type impeller made of polyethylene mounted on a 316 stainless steel shaft. The shaft passed through a journal which contained two sets of stainless steel bearings, in addition to collars and "O"

rings. This journal was shown to be gas tight at sustained shaft speeds of 3000 rpm. Cooling of the journal was accomplished by a copper coil through which ice water was circulated. The stirring motor used was a Fisher Dynamix, rated at 1/20 h.p. The pH measurements were made with a Sargent combination glass-calomel electrode connected to a Corning Model 12 pH meter. It was found necessary to ground the stirring shaft since transient voltages were generated during operation which affected the pH measurement. The reaction cell was baffled with three ¼ inch × 6 inch baffles attached to the top plate. These extended to within ½ inch of the bottom of the vessel. Gases introduced into the reaction vessel were fed through polyethylene tubing supported by a 316 stainless steel jacket. This tube terminated in a Plexiglass tip which had an opening of about 1 mm in diameter. This top allowed the gas to bubble out directly below the three bladed impeller. All gases were metered through Matheson Model 610 flow meters with Brooks Model 8744 flow controllers. Fluctuation of rate of flow of gases was estimated to be less than 1% over a 4 hour interval. The temperature of the reactions was controlled by circulating hot water through the water jacket of the reaction vessel. The hot water was generated in a water bath using a Precision Portatemp controller. The temperature of the reaction vessel was constant to within 0.5° C. A Friedrichs type condenser was used to cool the offgases. Most of the ammonia in the offgas was condensed and returned to the reaction vessel. Ice water was circulated through the condenser. The temperature of the offgases generally was about 15° C. The offgas then passed through a trap containing 2M sulfuric acid with thymol blue indicator. Any ammonia leaving the system was trapped here. The offgases then went through a bubble meter which allowed the offgas rate to be measured. Samples were taken from the reaction vessel with a 1 ml hypodermic syringe with a 6 inch stainless steel needle. A septum type stopper in the access port prevented significant quantities of air from entering the system.

CHEMICALS

The ammonia concentration in all of the experiments was initially about 100 g $NH_3$/l. Adjustment of the ammonia level was obtained by sparging gaseous ammonia into the reaction vessel. Basic copper carbonate, assaying between 55–60% copper was used as the primary source of copper. Frequently small additions of purified copper powder were made to start the reaction. When nickel and cobalt were present, they were added as the basic carbonates. When chloride ion was present, it was added as sodium chloride. The carbon monoxide used was tech grade and an analysis was shown to contain 99+% CO with the major impurity being nitrogen. The hydrogen and nitrogen used were C.P. grade and were not analyzed for impurities. $CO_2$ gas, tech grade, was used to adjust pH downward when necessary.

After making up the reaction liquor to the required ammonia and copper concentration, and after adding any other materials such as nickel, etc., the pH of the solutions was adjusted to a selected value. After the reaction vessel was filled, the vessel was purged with nitrogen to remove any residual air. The reaction was started by adding about 1 gram of copper powder and connecting the carbon monoxide line to the reaction vessel.

Samples of the liquor were withdrawn at 5 minute intervals and analyzed for cuprous ion. The pH and offgas flow rate were recorded at approximately the same time. Analyses for ammonia and total copper were made before the experiment was started and after it was terminated. Generally ammonia losses were less than 5% during the course of an experiment.

Figure 2:
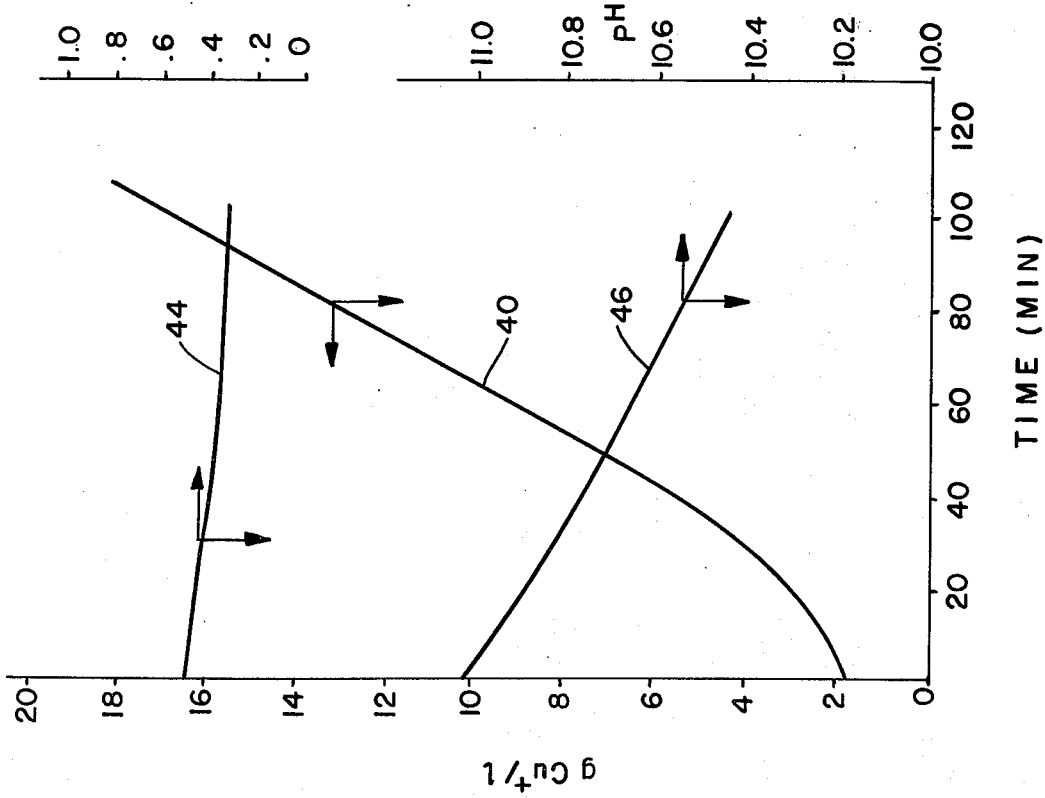
FIG. 2 is a curve showing the variation of $[Cu]^+$, pH and Pco with time.

In addition to curve 40, which shows the variation of $Cu^+$ concentration in grams per liter with time; FIG. 2 also includes curve 44, which shows the variation of the carbon monoxide pressure (Pco) with time, and curve 46 which shows the variation of pH with time. From these experiments, it was determined that the preferred CO pressure is between the range of 50–100 lbs/sq in. By operating the reaction vessels within this range, the size of the reactors can be reduced or the pH can be lowered.

An alternative embodiment of the present invention is shown schematically in FIG. 4. In this embodiment of the invention, the reducing gas flows in a co-current manner with the flow of nodules into the reactors. As is shown in FIG. 4, the system includes six stages, that is a first stage, second stage and so forth, represented by reference numerals 51–56, respectively. In this system, nodules are introduced into the first five reactors as is shown by arrows 60 through 64. Carbon monoxide reducing gas is introduced through the bottom of the first reactor 51 in the series; is sparged therethrough; collected at the top; and flowed through each stage until it reaches the last reactor 56; whereupon it is removed and treated to recover any ammonia dissolved therein. The flow of carbon monoxide through the reactors is as follows: Carbon monoxide enters reactor 51, as is shown by arrow 70, exits from the top thereof and enters reactor 52 through the bottom, as is shown by the arrow 72. The gas leaving reactor 52 through the top thereof is conducted to the bottom of reactor 53, as is shown by the arrow 74. The flow pattern continues, as is shown by arrows 76, 78 and 80. Of course slurry flows from the first through the last reactor as is indicated by lines 81, 82, 83, 84 and 85. Slurry exits the last reactor and enters the clarifier 86 as is shown by arrow 87. At this point it should be noted that one of the major advantages of a co-current flow of the nodules and reducing gases is that a large amount of reducing gas is available at the first stage where the need for cuprous ion regeneration is greatest.

As is shown in FIG. 4, heat exchangers 90, 91, 92, 93 and 94 are positioned between stages to enable the slurry to be cooled to a desired temperature which is preferably between the range of 35°–55° C.

With the arrangement shown in FIG. 4, the carbon monoxide pressure is greatest in the first reactor and is diminished after passing through each subsequent reactor. The major reason why the pressure decreases as the gas is fed through the series of reactors is that the carbon monoxide is consumed in each reactor. Therefore less carbon monoxide enters each successive reactor.

As is also shown in FIG. 4 additional carbon monoxide may be sent through reactors 52 through 56 along line 100, 101, 102, 103 and 104. The ability to bypass some fresh carbon monoxide directly into any given stage is desirable and an additional control feature to maintain the proper cuprous ion concentration. Various parameters for the pressure cascade system are set forth in Table II below.

In accordance with the present invention, the pressure of the carbon monoxide at the first stage should be at a pressure within the range of 50–100 lbs/sq in.

TABLE II

Parameters for Pressure Cascade System

| | | |
|---|---|---|
| Total copper, g/l | 6.6 | |
| Cuprous copper, g/l | 5.25 | |
| pH measured at 50° C | 10.8 | |
| Temperature (all stages) | 56° C | |
| Residence time per stage | 5 minutes | |
| Manganese reduction, % | 95.8 | |
| CO utilization, overall, % | 96.1 | |
| Pressure at impeller, atm | | |
| Stage 1 reference number | 51 | 6.75 |
| 2 | 52 | 5.75 |
| 3 | 53 | 4.75 |
| 4 | 54 | 3.75 |
| 5 | 55 | 2.75 |
| 6 | 56 | 1.75 |
| Nodule feed distribution, % | | |
| Stage 1 reference number | 51 | 55.2 |
| 2 | 52 | 19.9 |
| 3 | 53 | 13.5 |
| 4 | 54 | 8.2 |
| 5 | 55 | 3.2 |
| 6 | 56 | 0 |
| Working volume of each slurry/reactor, gal | 84,400 | |
| No. reactors | 6 | |
| Liquor recycle flowrate, g/m | 16,900 (gal/min) | |
| CO purity, % CO | 95.0 | |
| Solids in effluent | | |
| From stage 6 | 5.25 % | |
| From clarifier underflow | 40 % | |

From the foregoing it is apparent that it is desirable to increase the rate at which cuprous ions in a reaction vessel is regenerated and to prevent the amount of cuprous ions from being consumed to a point at which their regeneration is difficult. In accordance with the present invention the rate of regeneration of cuprous ions is increased by increasing the pressure in the reaction vessel. In one important embodiment of the invention, the reducing gas is flowed through each reactor in succession, to facilitate maintaining a high pressure in the first reactor where regeneration is needed most. Another way to prevent cuprous ion depletion is to employ multiple point injection of the nodules to be processed. Of course, another aspect of the invention is to operate the reduction circuit in an isothermal mode and to maintain the temperature of the reduction circuit within the range of 35°–55° C to increase nickel and cobalt solubilization. Several embodiments of this aspect of the invention have been disclosed; but, modification will be apparent to those skilled in this art. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process in which one or more metal values selected from the group of copper, nickel, cobalt and molybdenum are recovered from a manganese containing ore by introducing the ore into reaction vessels containing an aqueous ammoniacal-ammonium carbonate solution and cuprous ions and in which the cuprous ions reduce the manganese oxides in the ore and are oxidized to cupric ions to enable the metal values in the ore to be solubilized in the aqueous ammoniacal-ammonium carbonate solution and in which cuprous ions are continuously regenerated by reacting cupric ions in the aqueous phase with carbon monoxide in the gaseous phase wherein the improvement comprises:

a. introducing the manganese containing ore into the reaction vessels containing cuprous ions under flow conditions such that the amount of cuprous ions in a reaction vessel is always greater than 2 grams per liter to enable the regeneration of cuprous ions from cupric ions through the formation of a complex having the formula [CuCOOH] by the reaction of cuprous ions, carbon monoxide and hydroxide ions in accordance with the following equations:

$Cu^+ (solution) + CO(solution) \rightleftarrows CuCO^+(solution)$

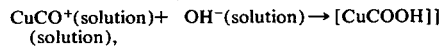
$CuCO^+(solution) + OH^-(solution) \rightarrow [CuCOOH]$ (solution), the formation of [CuCOOH] being the rate limiting chemical reaction for the reduction of cupric ions to cuprous ions with carbon monoxide;

b. flowing the manganese containing ore through a series of said reaction vessels containing cuprous ions to form a reaction product; and c. removing heat as required from the reaction product entering such subsequent reaction vessel so that the temperature within each reaction vessel during the reaction is within the range of 35°–55° C.

2. The process as set forth in claim 1 wherein the average residence time for the ores in the system is 20 minutes per reaction vessel.

3. The process as set forth in claim 1 including the step of maintaining the carbon monoxide pressure at a value within the range of 50–100 lb.sq.in. to increase the rate of cuprous ions regeneration.

4. The process as set forth in claim 3 wherein the average residence time for the ores in the system is 20 minutes per reaction vessel.

5. The process as set forth in claim 1 wherein a sufficient amount of heat is removed from the reaction product entering each reactor so that the temperature in each reactor during the reaction is about approximately 55° C.

6. The process as set forth in claim 5 wherein the average residence time for the ores in the system is 20 minutes per reaction vessel.

7. In a process in which one or more metal values selected from the group of copper, nickel, cobalt and molybdenum are recovered from a manganese containing ore by introducing the ore into reaction vessels containing an aqueous ammoniacal-ammonium carbonate solution and cuprous ions and in which the cuprous ions reduce the manganese oxides in the ore and are oxidized to cupric ions to enable the metal values in the ore to be solubilized in the aqueous ammoniacal-ammonium carbonate solution and in which cuprous ions are continuously regenerated by reacting cupric ions in the aqueous phase with carbon monoxide in the gaseous phase wherein the improvement comprises:

a. maintaining the amount of cuprous ions in a reaction vessel greater than 2 grams per liter by injecting the manganese containing ore into several vessels containing cuprous ions and connected in series in amounts calculated to reduce the possibility that the manganese containing ore will exhaust the supply of cuprous ions by reacting completely with it to enable the regeneration of cuprous ions from cupric ions through the formation of a complex having the formula [CuCOOH] by the reaction of cuprous ions, carbon monoxide and hydroxide ions in accordance with the following equation:

$$Cu^+(solution) + CO(solution) \rightleftarrows CuCO \text{ (solution)}$$

$$CuCO^+(solution) + OH^-(solution) \rightarrow [CuCOOH] \text{ (solution)};$$

the formation of [CuCOOH] being the rate limiting chemical reaction for the reduction of cupric ions with carbon monoxide;

b. flowing the manganese containing ore through a series of said reaction vessels containing cuprous ions to form a reaction product; and, c. removing heat as required from the reaction product entering each subsequent reaction vessel so that the temperature within each reaction vessel during the reaction is within the range of 35°–55° C.

8. The process as set forth in claim 7 including the step of maintaining the carbon monoxide pressure at a value within the range of 50–100 lb.sq.in. to increase the rate of cuprous ions regeneration.

9. The process as set forth in claim 8 wherein the average residence time for the ores in the system is 20 minutes per reaction vessel.

10. The process as set forth in claim 8 wherein a sufficient amount of heat is removed from the reaction product entering each reactor so that the temperature in each reactor during the reaction is about approximately 55° C.

11. A continuous process for the recovery of a base metal value selected from the group of copper, nickel, cobalt and molybdenum from a manganese containing ore comprising:

a. introducing streams of said manganese containing ore simultaneously into a plurality of reaction vessels connected in series and containing cuprous ions dissolved in an aqueous ammoniacal-ammonium carbonate solution wherein the cuprous ions reduce the manganese oxides in the ore and enable the metal values to be solubilized by the aqueous ammoniacal-ammonium carbonate solution while the cuprous ions are oxidized to cupric ions, regenerating cuprous ions from cupric ions by passing carbon monoxide gas through the aqueous solution in each reaction vessel and delivering reduced manganese ore through each reaction vessel to a recovery zone for recovering solubilized metal values therefrom, the flow rates of said streams of manganese containing ore introduced into each vessel and the flow rate of said reducing gas being controlled so that the amount of cuprous ions in a reaction vessel is always above about 2 grams per liter to enable the regeneration of cuprous ions through the formation of a complex having the formula [CuCOOH] by the reaction of cuprous ions, carbon monoxide and hydroxide ions in accordance with the following equations:

$$Cu^+(solution) + CO(solution) \rightleftarrows CuCO^+(solution)$$

$$CuCO^+(solution) + OH^-(solution) \rightarrow [CuCOOH] \text{ (solution)};$$

the formation of [CuCOOH] being the rate limiting chemical reaction for the reduction of cupric ions to cuprous ions with carbon monoxide; and b. removing heat as required from the reaction product entering such subsequent reaction vessel so that the temperature within each reaction vessel during the reaction is within the range of 35°–55° C.

12. The process as set forth in claim 11 including the step of maintaining the carbon monoxide pressure at value within the range of 50–100 lb.sq.in. to increase the rate of cuprous ions regeneration.

13. The process as set forth in claim 12 wherein a sufficient amount of heat is removed from the reaction product entering each reactor so that the temperature in each reactor during the reaction is about approximately 55° C.

14. The process as set forth in claim 12 wherein the reduced ore is delivered to at least one reaction vessel containing cuprous ions in which only maganese ore from another reaction vessel is delivered.

15. The process as set forth in claim 11 wherein the average residence time for the ores in the system is 20 minutes per reaction vessel.

* * * * *